United States Patent [19]
Chitty, Jr. et al.

[11] Patent Number: 5,058,622
[45] Date of Patent: Oct. 22, 1991

[54] VALVE LOCK ASSEMBLY

[75] Inventors: Gordon W. Chitty, Jr., Trussville; Jerry L. Nichols, Birmingham, both of Ala.

[73] Assignee: Stockham Valves & Fittings, Inc., Birmingham, Ala.

[21] Appl. No.: 464,459

[22] Filed: Jan. 12, 1990

[51] Int. Cl.$^5$ ............................................. F16K 35/00
[52] U.S. Cl. ...................................... 137/385; 251/95
[58] Field of Search .................... 137/385; 251/90, 95; 70/175-177, 180

[56] References Cited
U.S. PATENT DOCUMENTS

| | | | |
|---|---|---|---|
| 664,462 | 12/1900 | Campbell | 137/385 |
| 3,156,256 | 11/1964 | Weaver | 137/385 |
| 4,162,690 | 7/1979 | Anderson | 137/385 |
| 4,848,724 | 7/1989 | Pettinaroli | 251/95 |

FOREIGN PATENT DOCUMENTS 3727883 10/1988 United Kingdom ............... 137/385

Primary Examiner—A. Michael Chambers
Attorney, Agent, or Firm—Thad G. Long

[57] ABSTRACT

A valve lock assembly comprising a post member and a slide member, in which the post member is affixed to the valve stem of a valve and the side member can slide up and down around the post member, the slide member being so configured that it engages one or more of the stops on the valve to prevent rotation of the valve handle between the stops but, when slid upwardly, disengages from the stop and permits rotation of the valve handle.

83 Claims, 6 Drawing Sheets

VALVE LOCK ASSEMBLY

BACKGROUND OF THE INVENTION

For many applications of valves, it is of critical importance that accidental or malicious tampering be prevented with respect to the opening or closing of the valves. This is especially true for valves used in oil fields, chemical plants and various specialty applications such as large aquariums.

Some of the solutions developed in the art prior to the present invention are locking devices such as those shown in the following issued U.S. Pat. Nos. which are known to the inventor: Plympton, 3,960,168; Labita, 4,483,366; Stainbrook, 2,099,869; Doubble, 2,462,951; Maydock, 3,406,708; Mullis, 3,865,130; Mullis, 4,498,320; Biggs, 1,316,412; Durning, 1,541,801; and others referenced in the foregoing patents.

All of the locking devices heretofore developed for valves, of which the inventor is aware, have various shortcomings. In some instances, the locking device leaves the valve handle nut exposed and subject to tampering which could defeat the purpose of the lock in the case of intentional tampering. In other instances, the locking device will not work on ball valves, which is an increasingly prevalent style of valve. In still other instances, the locking device must be specially cast, stamped out or molded, which adds substantially to its production cost, especially for low volume production.

It is an object of the present invention to provide substantial immobilization for the valve handle without the necessity of installing a padlock to guard against accidental operation of the valve from vibration or unintentional physical contact. It is a further object of the present invention to provide reasonably secure immobilization of the valve handle by the addition of a standard padlock. It is a further object of the present invention to prevent access to the valve stem and valve nut, so that the locked and substantially immobilized valve handle cannot be by-passed, accidentally or intentionally, to change the setting of the valve. It is a still further object of the present invention to provide a less expensive locking option for ball valves which can easily be installed by the end-user on standard ball valves without adding additional production costs to the standard ball valve.

SUMMARY OF THE INVENTION

The present invention takes advantage of the "stops" which are generally an integral part of valve assemblies, and which limit the extent of rotation of the valve handle between fully open and fully closed positions. In its preferred configuration, a section of pipe or other cylindrical object is utilized as a slide member, having an inside diameter large enough to surround a portion of the valve handle assembly (exclusive of the handle itself) but small enough so that it will not rotatably clear the "stops" after the pipe is cut or machined as described below. In the lower portion of the pipe section, the pipe is cut on one side so that the extending handle for the valve can fit into the space resulting from the cut, thus allowing the pipe to straddle the valve handle and permitting other parts of the lower portion of the pipe to rest in a low enough position to communicate with the "stops." This will often require a two-stage cut, the first of which is a relatively short cut (about the height of the stops) which extends over approximately 180° of the circumference of the lower portion of the pipe, and the second of which extends above the center of the first cut and is only wide enough to permit the valve handle to fit within the second cut. Opposite the two-stage cut described above and still in the lower portion of the pipe section, another cut is made, wide enough and high enough so that a stop and (if necessary) the rear part of the valve handle can be cleared through the second cut. By virtue of these two cuts, the pipe section can slide over the valve handle assembly, straddling the valve handle, and vertical edges of the two cuts will touch the stops, in either the fully open or fully closed position, so as to prevent movement of the handle.

If the pipe section or slide member with the cuts is removed or raised to a position higher than the uppermost extent of the two stops, the handle can be turned freely. In order to prevent removal of the locking mechanism, the present invention provides for replacement of the valve handle nut with a post member which is slightly smaller in circumference than the inside diameter of the pipe section and, when screwed into place in lieu of the valve handle nut, the member does not extend upward above the upper edge of the pipe section when the latter is in place straddling the handle and in the locking position (i.e., communicating with the "stops"), or at least does not extend far enough thereabove to permit said member from being unscrewed. The upper portion of said post member is wholly or partially hollow below a solid upper rim except that there of course must always be a part of the said post member attaching the upper rim to the lower screw-on portion of the member. The said member can be made from bar stock, machined at one end so as to screw like a nut onto the valve stem extending through the base of the valve handle and machined near the other end so as to remove a part of the outer metal of the bar stock, leaving a center column joining the upper solid rim with the lower screw-on portion.

In order to complete the locking mechanism in the aforesaid preferred configuration of the invention, two additional holes are cut in the upper portion of the pipe section or slide member in a position so that the arm of a standard padlock can be inserted through the two holes and through the space left below the upper rim of the said screw-on member. Thus, when the said post member is firmly in place in lieu of the valve nut and when the pipe section or slide member is fitted around it, straddling the handle and communicating with the stops, the insertion of the arm of a standard padlock through the upper holes in the pipe section will prevent the pipe section from being raised, because the arm of the standard lock will prevent upward movement of the pipe section when it touches the upper solid rim of the said screwed-on post member. When the raising of the pipe section or slide member is thus prevented, the lower portion of the pipe section remains in communication with the "stops" and prevents movement of the handle which the pipe section straddles.

By use of these standard pipes and bar stock, machined to achieve the configurations described above, a strong and effective locking assembly can be made which is relatively inexpensive and is very tamper resistant.

DETAILED DESCRIPTION OF THE DRAWINGS

Figure 1:
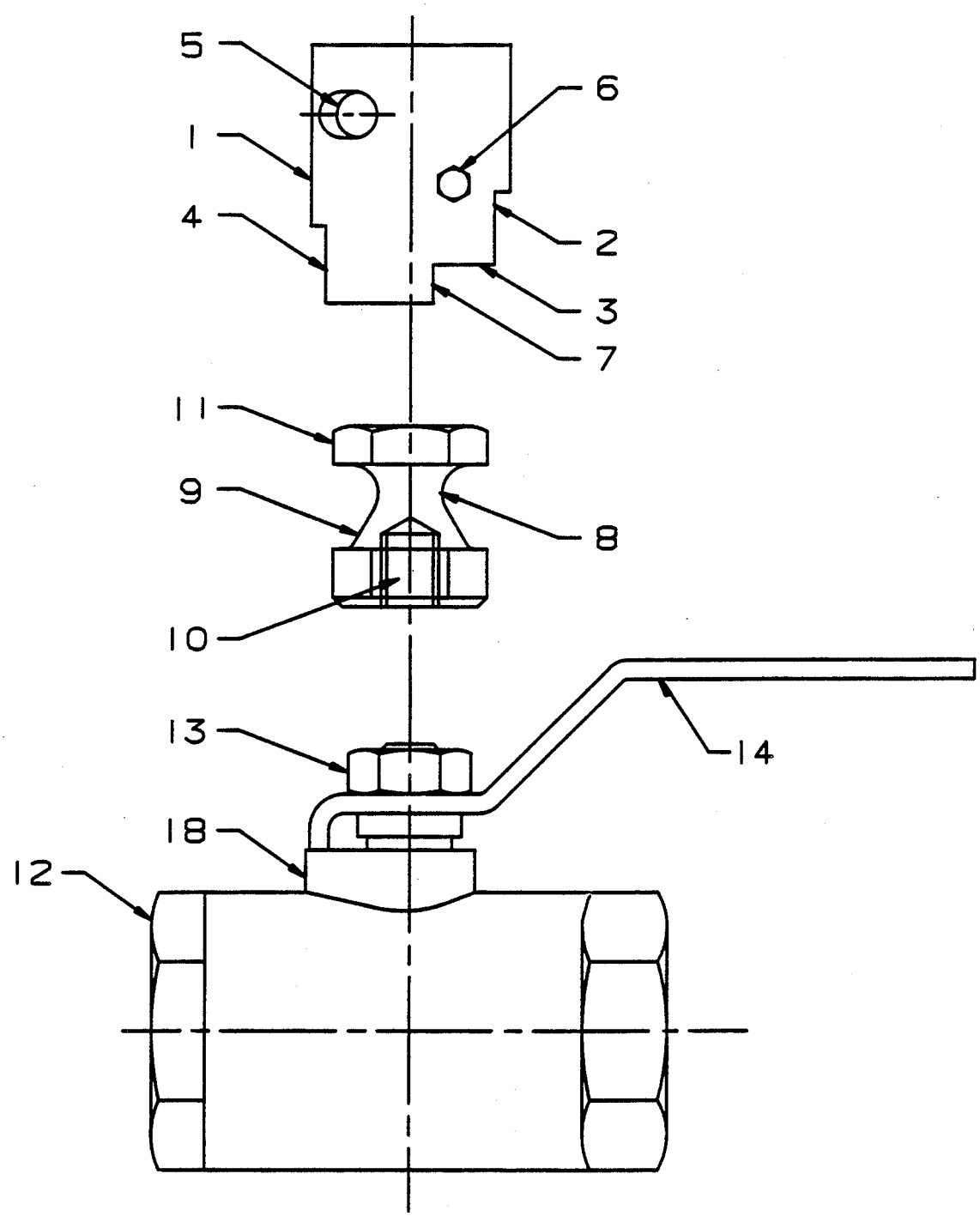
FIG. 1 is an exploded side view of the valve 12 and valve lock assembly 1 and 8.

FIG. 1 shows a typical valve 12 having a handle 14 and a valve nut 13, together with a preferred embodiment of the two piece lock assembly of the present invention, slide member 1 and post member 8. In order to use said lock assembly to lock the valve 12 in an open or closed position, valve nut 13 is first removed from valve 12 and then post member 8 is screwed onto the threaded valve stem to which valve nut 13 was previously attached so that said valve stem extends into chamber 10 of post member 8. Slide member 1 is then slid over post member 8 in such a way that edge 2 slides down along a side edge of valve handle 14 while a corresponding edge parallel to edge 2 slides down along the opposite side of valve handle 14 so as to confine valve handle 14 between said parallel edges 2 of slide member 1. When so assembled, edge 4 of slide member 1 will be adjacent to and will communicate with "stop" 18 of valve 12 (and simultaneously another edge of slide member 1 will be adjacent to and will communicate with a second "stop" of valve 12 so that the slide cannot rotate to any significant extent, thus preventing the handle 14 confined between parallel edges 2 of the slide member 1 from rotating, and thereby locking the handle 14 in a fixed open or closed position. Edges 7, 3 and 2 will be more particularly explained in the detailed description of FIG. 3.

If slide member 1 is raised so that edge 4 and other vertical edges of slide member 1 cease to be adjacent to and in communication with said "stops" then slide member 1 and the handle 14 can both rotate. Whenever it is desirable to lock the handle into an open or closed position so that it cannot be moved to any significant extent, it is necessary only to prevent slide assembly 1 from being raised above the "stops." This is accomplished by inserting the arm of a standard padlock (such as Master Lock #3 or equivalent) through hole 5 and out a nearby corresponding hole.

In the assembled position, the space defined by edge 9 of the post member 8 will be immediately behind the apertures 5 so that the insertion of the padlock arm is not obstructed. However, if one attempts to raise slide member 1 with the padlock arm inserted through hole 5 and through the space between slide members 1 and the portion of post member 8 defined by contour edge 9, the said padlock arm will be forced against the underneath side of the upper rim 11 of the post member 8. Because post member 8 is rigidly attached to valve 12, the upper rim 11 will restrain the upward movement of the padlock arm which in turn will restrain any upward movement of slide member 1. Since slide member 1 is in this manner prevented from getting clear of the "stops," the handle 14 remains immobile and locked so that it cannot rotate.

Retaining screw 6 is not a necessary part of the invention as herein disclosed, but is convenient for preventing the slide member 1 from getting separated from post member 2 while the said lock assembly is in an unlocked position. The retaining screw or other retaining means serves the useful purpose of allowing the slide member 1 to be raised sufficiently to permit rotation of the handle 14 without allowing total separation of the slide member 1 from the post member 8, preventing in this way possible loss of slide member 1. It also aids somewhat in alignment of the lock assembly. However, such retaining means plays no role in the actual locking or unlocking of the said lock assembly.

Figure 2:
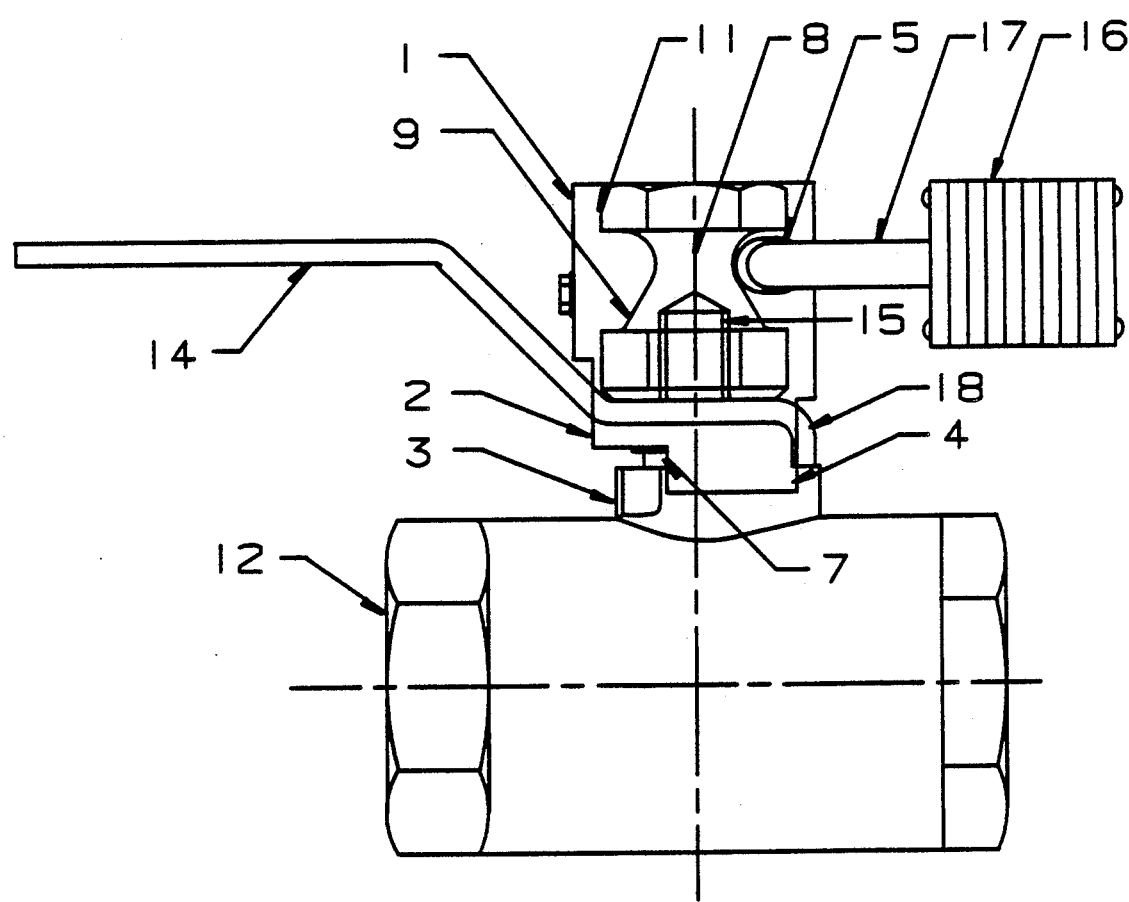
FIG. 2 is a side view of the valve, valve lock assembly, and padlock in a locked position.

FIG. 2 is a drawing showing the valve and valve locking assembly in a locked position. It is readily seen that post member 8 (shown in dotted outline) has been screwed onto threaded valve stem 15 (also shown in dotted outline) extending through the base of handle 14. Slide member 1 has been placed so that it surrounds post member 8 and straddles valve handle 14 so as to confine the handle within the parallel edges 2 (only one of which is visible in this drawing). Edge 7 communicates with stop 8 in the closed position. The other corresponding edges which are not visible communicate in the open position. Padlock arm 17 is inserted through double apertures 5 and locked in padlock 16. Upward movement of slide member 1 is prevented by padlock arm 17 which cannot be moved past upper rim 11 of post member 8 which is rigidly attached to the valve as noted previously. When upward movement of slide member 1 is so restrained, slide member 1 cannot clear the stops and therefore cannot be rotated, thereby simultaneously confining handle 14 in an immobile position.

Figure 3:
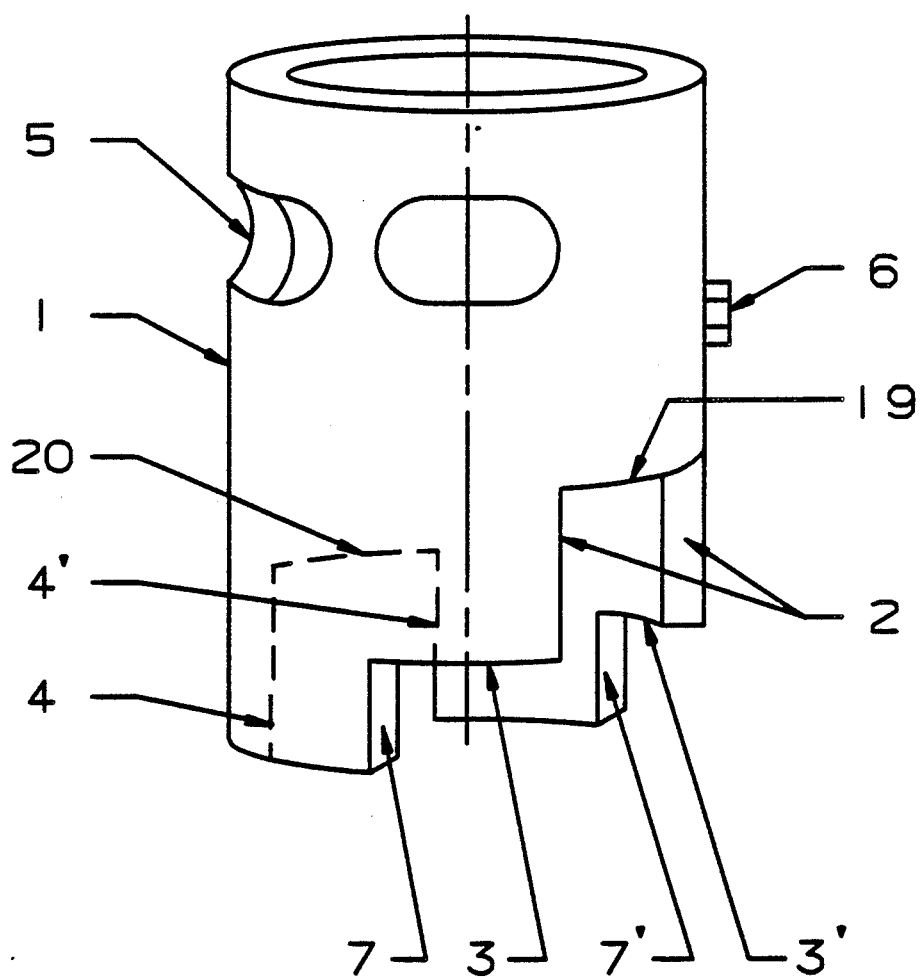
FIG. 3 is a perspective view of the slide member 1 of the lock assembly showing certain of the cut-out areas thereof.

FIG. 3 shows details of a side of slide member 1. In this drawing, a cylindrical slide member is shown, from which has been cut out or otherwise removed a segment defined by edges 3, 7, 2 and 19. The space so defined by 2 and 19 is designed to fit securely around typical valve handles, with edge 19 touching or nearly touching the top of the valve handle and edges 2 touching or nearly touching two sides of such valve handle. The additional "cut-out" area defined by edges 3 (3') and 7 (7') is made necessary to permit proper communication of the slide member 1 with the "stops" of the valve. For example, in one locked position, edge 7' will prevent rotation by communicating with and being obstructed by a "stop" on the valve. In another locked position, edge 7 will prevent rotation in the opposite direction by communicating with and being obstructed by another "stop" on the valve. Such communication of slide member 1 with the stops on the valve would not be possible if edges 2 extended down as far as the projected circumference of the lower base of slide member 1. The distance between edges 2 is defined substantially by the width of the handle which must fit between lines 2. The distance between edges 7 and 4 is defined substantially by the distance between the stops. Similarly, the distance between 7' and 4' is also defined substantially by the distance between the stops. Such considerations determine the placement of the vertical edges. The height of edge 19 is determined substantially by the height of the handle; edge 19 must be at least high enough so that edges 7 and 7' can make contact with the "stops" and still accommodate the valve handle within the confines of edges 2 and 19. As shown in FIG. 3, non-essential retaining means 6 is positioned so that it enters slide member 1 at a level low enough so that upward movement a distance greater than the height of edge 3 would be permitted, thus allowing the lower vertical edges to clear the "stops," but would be limited by the base 21 of the post member 8 (see detailed description of FIG. 5). The apertures 5 are of such size and spaced sufficiently apart to permit the arms of standard padlocks and other locking devices to be inserted through one aperture and out the other so that such arm or other rigid locking member can be secured unremovably except for a person having a key or other standard means of unlocking said arm or other rigid locking member.

Figure 4:
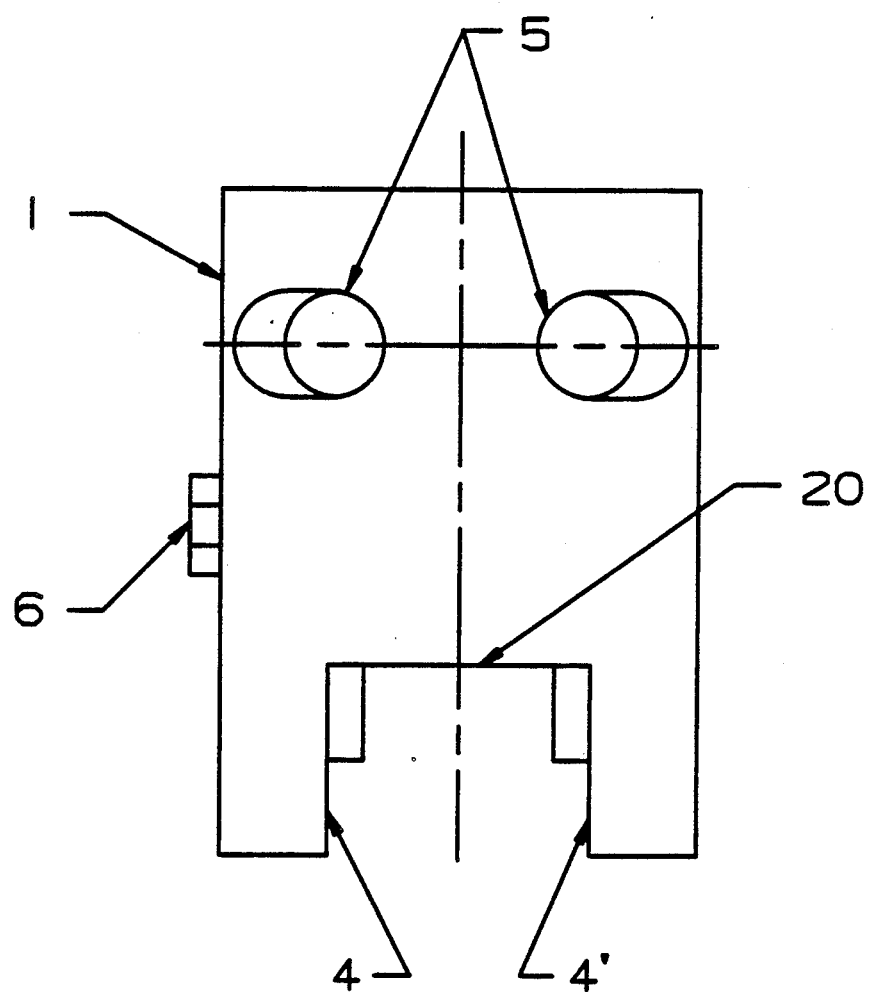
FIG. 4 is a frontal view of the slide member 1 of the lock assembly showing the holes 5 through which a padlock arm may be inserted and also a cut-out area in the lower portion opposite the lower cut-out areas shown in FIG. 3.

FIG. 4 shows the opposite side of slide member 1 as compared with the side shown and primarily discussed in the detailed description of FIG. 3. The apertures 5 were discussed in the immediately preceding paragraph, and the factors determining the spacing of edges 4 and 4' have also been previously discussed in connection with the detailed description of FIG. 3. It should be noted that edges 4 and 4' must be separated by sufficient distance in any event so that they can accommodate the width of two "stops" plus the width of the extension of the valve handle which touches the "stops" in the fully open and fully closed positions of the valve, since one of the other stops (alternately) and the said handle extension will always be within edges 4 and 4' when the value is locked by the present invention. The height of edge 20 is also determined by the height of said valve handle extension and the "stops," whichever has the greater height.

Figure 5:
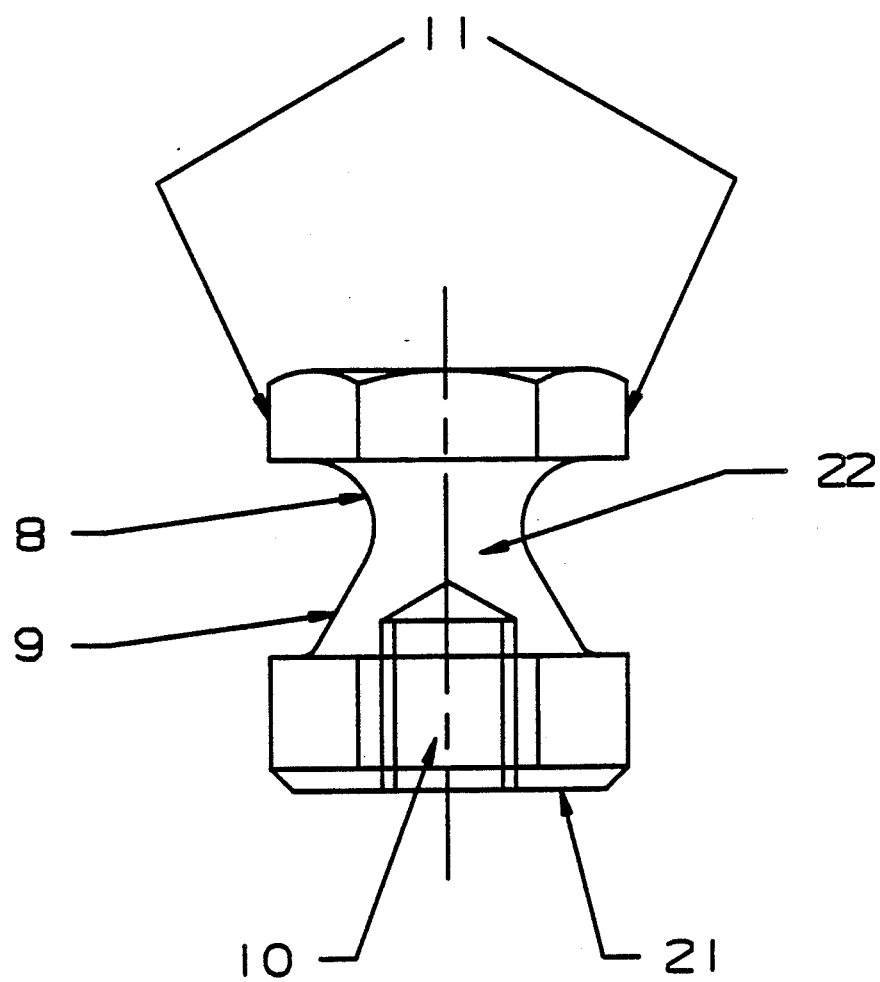
FIG. 5 is a side view of the post member of the lock assembly.

FIG. 5 shows a post member 8. It is not necessary that the space defined by contour 9 be symmetrical, only that there be space through which a padlock arm or other rigid locking means can be inserted after post member 8 has been screwed onto the valve in lieu of the valve nuts as previously discussed herein. However, it will often be convenient to have symmetrical or nearly symmetrical space all the way around as the contour 9 is taken through 360°, partly because such symmetry is a natural consequence of most machining processes and partly because of possible problems which could arise if the screwing of the post member 8 onto the valve resulted in insufficient space falling behind the apertures 5 previously discussed which might prevent insertion of a padlock arm or other rigid locking means through apertures 5. Obviously, the space defined by the contour line 9 can be of any configuration as long as sufficient space is provided for insertion of the padlock arm or other rigid locking means. The post member 8 will normally be of a generally cylindrical configuration, and the slide member will also normally be cylindrical, but such cylindrical shapes are unnecessary. They may be parallelepipeds or any other configuration. The cylindrical shape is believed to be the most desirable because it permits the locking assembly of the present invention to be machined out of standard pipes and bar stock. In any event the size of the circumference or perimeter of the upper rim 11 should be such as to prevent direct access by hands or tools when recessed within the slide member; otherwise, the post member 8 could be unscrewed notwithstanding the locked position of the locking assembly, thus permitting the slide member to be raised and the "stops" cleared, contrary to the objective sought to be achieved by locking. Furthermore, the upper rim 11 must be sufficiently thick and strong to prevent its being broken or bent if anyone attempts to force the padlock arm past the upper rim 11. The center post 22 or other means connecting the upper rim 11 with the base 21 of post member 8 must also be of sufficient strength to prevent breakage under application of normal human strengths. Chamber 10 is machined with a screw machine so as to make threads compatible with the threaded valve stem extending through the handle of the valve, i.e., threads substantially similar to those of the valve nut which it is intended to replace.

Figure 6:
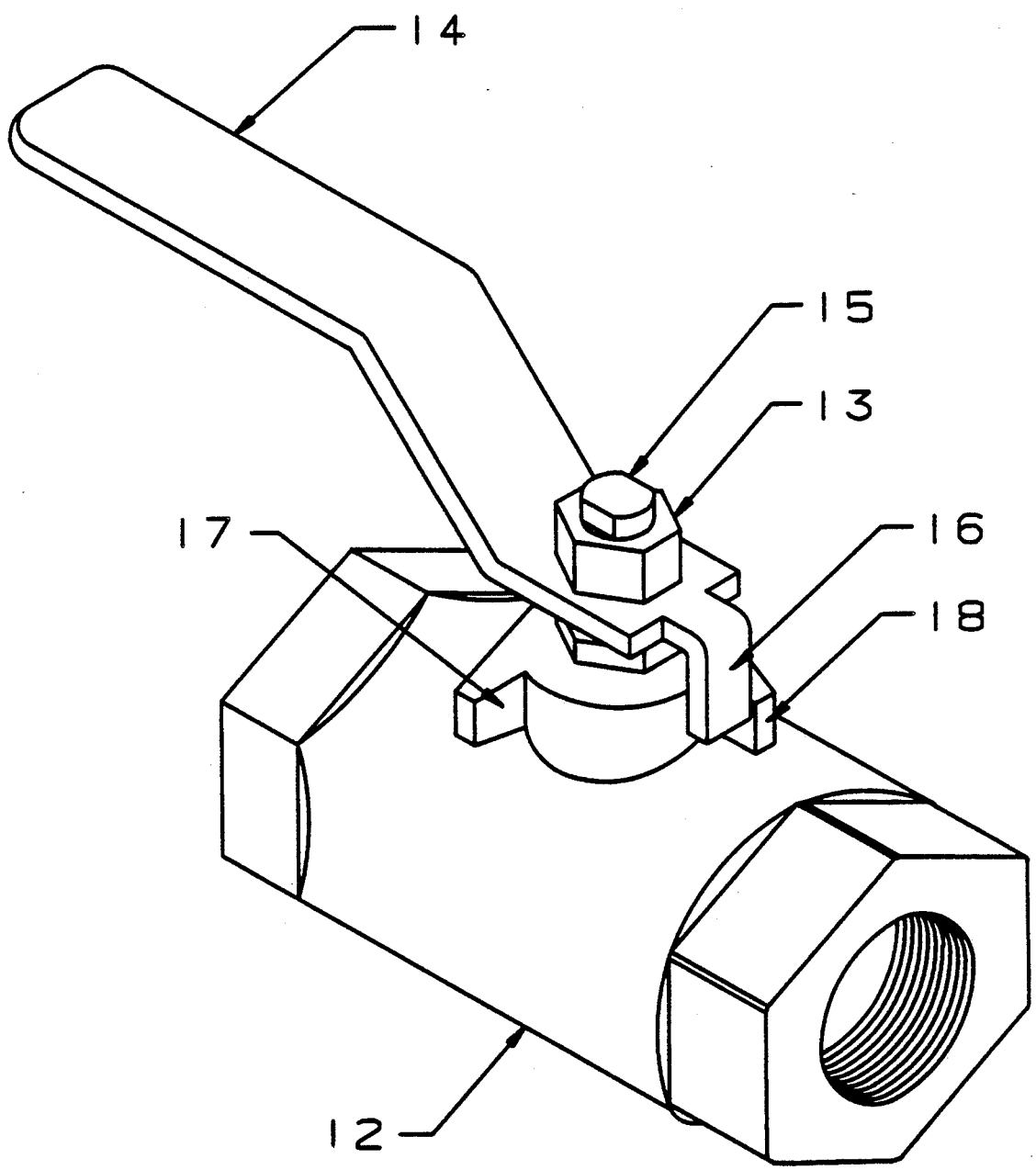
FIG. 6 is a perspective view of the valve 12 showing particularly the "stops" 17 and 18 which define the limits of rotation of the valve handle 14.

FIG. 6 is a perspective view showing a valve 12 with handle 14, handle extension 16 (which prevents rotation of the handle except between "stops"), "stops" 17 and 18, valve stem 15 containing a threaded bolt-like portion at the end, and valve nut 13. It is this valve nut 13 which is replaced by the post member described above and then substantially surrounded by the slide member to produce a valve capable of being locked by a padlock arm or other rigid locking mechanism as aforesaid.

Normally the slide member and post member will be of metal, but may be of plastic or any strong and rigid material. The sizes of valves vary, but there exists sufficient standardization in the industry to adjust the locking assembly invention to all or substantially all valve styles by adjusting the dimensions proportionately. The slide member and post member may be sold or distributed separately from valves themselves and may readily be installed in the field on existing valves. However, it would also be possible to sell valves with the locking assembly of slide member and post member already in place on the valve as sold. Sales or distributions of locking assemblies can similarly be made with or without padlocks or other rigid locking means.

What is claimed is:

1. A valve lock assembly for a rotary ball valve having a ball chamber, a rotatable control handle attached to the chamber so as to cause the chamber to rotate between fully open and fully closed positions, a handle extension rotatable in an arc of rotation between two stops which restrict movement of the handle and handle extension as the handle rotates the chamber between open and closed positions, and a threaded valve stem, which said assembly comprises a substantially rigid post member and a substantially rigid slide member slidable about the post member between an upward first position in which the slide member does not abut either of said stops and a lower second position in which a portion of the slide member abuts at least one stop, wherein:

a. said post member is attachable to said valve stem so that it can form the inner component of said valve lock assembly when the assembly is positioned about the valve stem; and b. said slide member is hollow with inside dimensions sized to permit it to slide down around said post member from the upward first position to the lower second position without substantial clearance and is configured as follows: (i) said slide member in the lower second position having sufficient length alternately to abut one of the stops in the arc of rotation while the handle extension abuts the second stop in the arc of rotation preventing movement of the handle and chamber in any direction of rotation when the stops are thus abutted by the handle extension at one extreme and the slide member at the other extreme; and (ii) said slide member having an opening with (A) a width at least equal to the width of the handle so that the slide member can straddle the handle and with (B) a height high enough to permit the slide member to abut the stops when the slide member is in the lower second position the post member and slide member in assembled relationship about the valve, with post member rigidly attached to the valve stem and with slide member in the lower second position in abutment with a stop, forming a rigid valve lock assembly which can be unlocked in normal operation only by lifting the slide member from the lower second position toward the upward first position so that the slide member no longer abuts a stop.

2. A valve lock assembly as described in claim 1 wherein said post member is generally cylindrical in shape.

3. A valve lock assembly as described in claim 2 wherein said slide member is generally cylindrical in shape.

4. A valve lock assembly as described in claim 3 wherein said post member and said slide member are so sized that said post member does not extend upwardly higher than said slide member, when said post member is secured to said valve stem and said slide member in the lower second position abuts a stop.

5. A valve lock assembly as described in claim 4 wherein a retaining means is employed to prevent said slide member from becoming separated from said post member while said members are in place on said valve, while allowing sufficient upward movement of said slide member to allow said slide member to clear said stops vertically.

6. A valve lock assembly as described in claim 4 wherein said post member has a concave depression below the top surface thereof sufficient in extent to accommodate within said depression the diameter of a standard padlock arm, and said slide member has two or more openings at least large enough and spaced apart sufficiently to allow a standard padlock arm to enter one said opening and exit another said opening, said concave depression located in a position immediately behind said openings when said post member is secured to said valve stem and said slide member in the lower second position abuts a stop.

7. A valve lock assembly as described in claim 6 wherein said post member and said slide member are made of metal.

8. A valve lock assembly as described in claim 7 wherein the means for securing said post member to said valve stem is the threaded walls of a recess in the bottom of said post member compatible with the threads on said valve stem so as to permit said post member to be screwed onto said valve stem.

9. A valve lock assembly as described in claim 8 wherein a retaining means is employed to prevent said slide member from becoming separated from said post member while said members are in place on said valve, while allowing sufficient upward movement of said slide member to allow said slide member to clear said stops vertically.

10. A valve lock assembly as described in claim 7 wherein a retaining means is employed to prevent said slide member from becoming separated from said post member while said members are in place on said valve, while allowing sufficient upward movement of said slide member to allow said slide member to clear said stops vertically.

11. A valve lock assembly as described in claim 6 wherein the means for securing said post member to said valve stem is the threaded walls of a recess in the bottom of said post member compatible with the threads on said valve stem so as to permit said post member to be screwed onto said valve stem.

12. A valve lock assembly as described in claim 11 wherein a retaining means is employed to prevent said slide member from becoming separated from said post member while said members are in place on said valve, while allowing sufficient upward movement of said slide member to allow said slide member to clear said stops vertically.

13. A valve lock assembly as described in claim 6 wherein a retaining means is employed to prevent said slide member from becoming separated from said post member while said members are in place on said valve, while allowing sufficient upward movement of said slide member to allow said slide member to clear said stops vertically.

14. A valve lock assembly as described in claim 4 wherein said post member and said slide member are made of metal.

15. A valve lock assembly as described in claim 14 wherein the means for securing said post member to said valve stem is the threaded walls of a recess in the bottom of said post member compatible with the threads on said valve stem so as to permit said post member to be screwed onto said valve stem.

16. A valve lock assembly as described in claim 15 wherein a retaining means is employed to prevent said slide member from becoming separated from said post member while said members are in place on said valve, while allowing sufficient upward movement of said slide member to allow said slide member to clear said stops vertically.

17. A valve lock assembly as described in claim 14 wherein a retaining means is employed to prevent said slide member from becoming separated from said post member while said members are in place on said valve, while allowing sufficient upward movement of said slide member to allow said slide member to clear said stops vertically.

18. A valve lock assembly as described in claim 4 wherein the means for securing said post member to said valve stem is the threaded walls of a recess in the bottom of said post member compatible with the threads on said valve stem so as to permit said post member to be screwed onto said valve stem.

19. A valve lock assembly as described in claim 18 wherein a retaining means is employed to prevent said slide member from becoming separated from said post member while said members are in place on said valve, while allowing sufficient upward movement of said slide member to allow said slide member to clear said stops vertically.

20. A valve lock assembly as described in claim 2 wherein the means for securing said post member to said valve stem is the threaded walls of a recess in the bottom of said post member compatible with the threads on said valve stem so as to permit said post member to be screwed onto said valve stem.

21. A valve lock assembly as described in claim 3 wherein a retaining means is employed to prevent said slide member from becoming separated from said post member while said members are in place on said valve, while allowing sufficient upward movement of said slide member to allow said slide member to clear said stops vertically.

22. A valve lock assembly as described in claim 3 wherein the means for securing said post member to said valve stem is the threaded walls of a recess in the bottom of said post member compatible with the threads on said valve stem so as to permit said post member to be screwed onto said valve stem.

23. A valve lock assembly as described in claim 22 wherein a retaining means is employed to prevent said slide member from becoming separated from said post member while said members are in place on said valve, while allowing sufficient upward movement of said slide member to allow said slide member to clear said stops vertically.

24. A valve lock assembly as described in claim 3 wherein said post member has a concave depression below the top surface thereof sufficient in extent to accommodate within said depression the diameter of a standard padlock arm, inches in height, and said slide member has two or more openings at least large enough and spaced apart sufficiently to allow a standard padlock arm to enter one said opening and exit another said opening, said concave depression located in a position immediately behind said openings when said post member is secured to the said valve stem and said slide member in the lower second position abuts a stop.

25. A valve lock assembly as described in claim 24 wherein said post member and said slide member are made of metal.

26. A valve lock assembly as described in claim 25 wherein the means for securing said post member to said valve stem is the threaded walls of a recess in the bottom of said post member compatible with the threads on said valve stem so as to permit said post member to be screwed onto said valve stem.

27. A valve lock assembly as described in claim 26 wherein a retaining means is employed to prevent said slide member from becoming separated from said post member while said members are in place on said valve, while allowing sufficient upward movement of said slide member to allow said slide member to clear said stops vertically.

28. A valve lock assembly as described in claim 25 wherein a retaining means is employed to prevent said slide member from becoming separated from said post member while said members are in place on said valve, while allowing sufficient upward movement of said slide member to allow said slide member to clear said stops vertically.

29. A valve lock assembly as described in claim 24 wherein the means for securing said post member to said valve stem is the threaded walls of a recess in the bottom of said post member compatible with the threads on said valve stem so as to permit said post member to be screwed onto said valve stem.

30. A valve lock assembly as described in claim 29 wherein a retaining means is employed to prevent said slide member from becoming separated from said post member while said members are in place on said valve, while allowing sufficient upward movement of said slide member to allow said slide member to clear said stops vertically.

31. A valve lock assembly as described in claim 24 wherein a retaining means is employed to prevent said slide member from becoming separated from said post member while said members are in place on said valve, while allowing sufficient upward movement of said slide member to allow said slide member to clear said stops vertically.

32. A valve lock assembly as described in claim 3 wherein said post member and said slide member are made of metal.

33. A valve lock assembly as described in claim 32 wherein the means for securing said post member to said valve stem is the threaded walls of a recess in the bottom of said post member compatible with the threads on said valve stem so as to permit said post member to be screwed onto said valve stem.

34. A valve lock assembly as described in claim 32 wherein a retaining means is employed to prevent said slide member from becoming separated from said post member while said members are in place on said valve, while allowing sufficient upward movement of said slide member to allow said slide member to clear said stops vertically.

35. A valve lock assembly as described in claim 33 wherein a retaining means is employed to prevent said slide member from becoming separated from said post member while said members are in place on said valve, while allowing sufficient upward movement of said slide member to allow said slide member to clear said stops vertically.

36. A valve lock assembly as described in claim 2 wherein said post member has a concave depression below the top surface thereof sufficient in extent to accommodate within said depression the diameter of a standard padlock arm, and said slide member has two or more openings at least large enough and spaced apart sufficiently to allow a standard padlock arm to enter one said opening and exit another said opening, said concave depression located in a position immediately behind said openings when said post member is secured to said valve stem and said slide member in the lower second position abuts a stop.

37. A valve lock assembly as described in claim 36 wherein said post member and said slide member are made of metal.

38. A valve lock assembly as described in claim 37 wherein the means for securing said post member to said valve stem is the threaded walls of a recess in the bottom of said post member compatible with the threads on said valve stem so as to permit said post member to be screwed onto said valve stem.

39. A valve lock assembly as described in claim 33 wherein a retaining means is employed to prevent said slide member from becoming separated from said post member while said members are in place on said valve, while allowing sufficient upward movement of said slide member to allow said slide member to clear said stops vertically.

40. A valve lock assembly as described in claim 37 wherein a retaining means is employed to prevent said slide member from becoming separated from said post member while said members are in place on said valve, while allowing sufficient upward movement of said slide member to allow said slide member to clear said stops vertically.

41. A valve lock assembly as described in claim 36 wherein the means for securing said post member to said valve stem is the threaded walls of a recess in the bottom of said post member compatible with the threads on said valve stem so as to permit said post member to be screwed onto said valve stem.

42. A valve lock assembly as described in claim 2 wherein said post member and said slide member are made of metal.

43. A valve lock assembly as described in claim 42 wherein the means for securing said post member to said valve stem is the threaded walls of a recess in the bottom of said post member compatible with the threads on said valve stem so as to permit said post member to be screwed onto said valve stem.

44. A valve lock assembly as described in claim 1 wherein said slide member is generally cylindrical in shape.

45. A valve lock assembly as described in claim 44 wherein said post member has a concave depression below the top surface thereof sufficient in extent to accommodate within said depression the diameter of a standard padlock arm, and said slide member has two or more openings at least large enough and spaced apart sufficiently to allow a standard padlock arm to enter one said opening and exit another said opening, said concave depression located in a position immediately behind said openings when said post member is secured to said valve stem and said slide member in the lower second position abuts a stop.

46. A valve lock assembly as described in claim 45 wherein said post member and said slide member are made of metal.

47. A valve lock assembly as described in claim 46 wherein the means for securing said post member to said valve stem is the threaded walls of a recess in the bottom of said post member compatible with the threads on said valve stem so as to permit said post member to be screwed onto said valve stem.

48. A valve lock assembly as described in claim 47 wherein a retaining means is employed to prevent said slide member from becoming separated from said post member while said members are in place on said valve, while allowing sufficient upward movement of said slide member to allow said slide member to clear said stops vertically.

49. A valve lock assembly as described in claim 45 wherein the means for securing said post member to said valve stem is the threaded walls of a recess in the bottom of said post member compatible with the threads on said valve stem so as to permit said post member to be screwed onto said valve stem.

50. A valve lock assembly as described in claim 44 wherein said post member and said slide member are made of metal.

51. A valve lock assembly as described in claim 50 wherein the means for securing said post member to said valve stem is the threaded walls of a recess in the bottom of said post member compatible with the threads on said valve stem so as to permit said post member to be screwed onto said valve stem.

52. A valve lock assembly as described in claim 44 wherein the means for securing said post member to said valve stem is the threaded walls of a recess in the bottom of said post member compatible with the threads on said valve stem so as to permit said post member to be screwed onto said valve stem.

53. A valve lock assembly as described in claim 1 wherein said post member and said slide member are so sized that said post member does not extend upwardly higher than said slide member when said post member is secured to said valve stem and said slide member in the lower second position abuts a stop and surrounds said post member.

54. A valve lock assembly as described in claim 53 wherein said post member has a concave depression below the top surface thereof sufficient in extent to accommodate within said depression the diameter of a standard padlock arm, in height, and said slide member has two or more openings at least large enough and spaced apart sufficiently to allow a standard padlock arm to enter one said opening and exit another said opening, said concave depression located in a position immediately behind said openings when said post member is secured to said valve stem and said slide member in the lower second position abuts a stop.

55. A valve lock assembly as described in claim 54 wherein said post member and said slide member are made of metal.

56. A valve lock assembly as described in claim 55 wherein a retaining means is employed to prevent said slide member from becoming separated from said post member while said members are in place on said valve, while allowing sufficient upward movement of said slide member to allow said slide member to clear said stops vertically.

57. A valve lock assembly as described in claim 55 wherein the means for securing said post member to said valve stem is the threaded walls of a recess in the bottom of said post member compatible with the threads on said valve stem so as to permit said post member to be screwed onto said valve stem.

58. A valve lock assembly as described in claim 57 wherein a retaining means is employed to prevent said slide member from becoming separated from said post member while said members are in place on said valve, while allowing sufficient upward movement of said slide member to allow said slide member to clear said stops vertically.

59. A valve lock assembly as described in claim 54 wherein the means for securing said post member to said valve stem is the threaded walls of a recess in the bottom of said post member compatible with the threads on said valve stem so as to permit said post member to be screwed onto said valve stem.

60. A valve lock assembly as described in claim 39 wherein a retaining means is employed to prevent said slide member from becoming separated from said post member while said members are in place on said valve, while allowing sufficient upward movement of said slide member to allow said slide member to clear said stops vertically.

61. A valve lock assembly as described in claim 54 wherein a retaining means is employed to prevent said slide member from becoming separated from said post member while said members are in place on said valve, while allowing sufficient upward movement of said slide member to allow said slide member to clear said stops vertically.

62. A valve lock assembly as described in claim 53 wherein said post member and said slide member are made of metal.

63. A valve lock assembly as described in claim 62 wherein the means for securing said post member to said valve stem is the threaded walls of a recess in the bottom of said post member compatible with the threads on said valve stem so as to permit said post member to be screwed onto said valve stem.

64. A valve lock assembly as described in claim 63 wherein a retaining means is employed to prevent said slide member from becoming separated from said post member while said members are in place on said valve, while allowing sufficient upward movement of said slide member to allow said slide member to clear said stops vertically.

65. A valve lock assembly as described in claim 62 wherein a retaining means is employed to prevent said slide member from becoming separated from said post member while said members are in place on said valve, while allowing sufficient upward movement of said slide member to allow said slide member to clear said stops vertically.

66. A valve lock assembly as described in claim 53 wherein the means for securing said post member to said valve stem is the threaded walls of a recess in the bottom of said post member compatible with the threads on said valve stem so as to permit said post member to be screwed onto said valve stem.

67. A valve lock assembly as described in claim 66 wherein a retaining means is employed to prevent said slide member from becoming separated from said post member while said members are in place on said valve, while allowing sufficient upward movement of said slide member to allow said slide member to clear said stops vertically.

68. A valve lock assembly as described in claim 53 wherein a retaining means is employed to prevent said slide member from becoming separated from said post member while said members are in place on said valve, while allowing sufficient upward movement of said slide member to allow said slide member to clear said stops vertically.

69. A valve lock assembly as described in claim 1 wherein said post member has a concave depression below the top surface thereof sufficient in extent to accommodate within said depression the diameter of a standard padlock arm, and said slide member has two or more openings at least large enough and spaced apart sufficiently to allow a standard padlock arm to enter one said opening and exit another said opening, said concave depression located in a position immediately behind said openings when said post member is secured to said valve stem and said slide member in the lower second position abuts a stop.

70. A valve lock assembly as described in claim 69 wherein said post member and said slide member are made of metal.

71. A valve lock assembly as described in claim 70 wherein the means for securing said post member to said valve stem is the threaded walls of a recess in the bottom of said post member compatible with the threads on said valve stem so as to permit said post member to be screwed onto said valve stem.

72. A valve lock assembly as described in claim 71 wherein a retaining means is employed to prevent said slide member from becoming separated from said post member while said members are in place on said valve, while allowing sufficient upward movement of said slide member to allow said slide member to clear said stops vertically.

73. A valve lock assembly as described in claim 70 wherein a retaining means is employed to prevent said slide member from becoming separated from said post member while said members are in place on said valve, while allowing sufficient upward movement of said slide member to allow said slide member to clear said stops vertically.

74. A valve lock assembly as described in claim 69 wherein a retaining means is employed to prevent said slide member from becoming separated from said post member while said members are in place on said valve, while allowing sufficient upward movement of said slide member to allow said slide member to clear said stops vertically.

75. A valve lock assembly as described in claim 69 wherein the means for securing said post member to said valve stem is the threaded walls of a recess in the bottom of said post member compatible with the threads on said valve stem so as to permit said post member to be screwed onto said valve stem.

76. A valve lock assembly as described in claim 75 wherein a retaining means is employed to prevent said slide member from becoming separated from said post member while said members are in place on said valve, while allowing sufficient upward movement of said slide member to allow said slide member to clear said stops vertically.

77. A valve lock assembly as described in claim 1 wherein said post member and said slide member are made of metal.

78. A valve lock assembly as described in claim 77 wherein the means for securing said post member to said valve stem is the threaded walls of a recess in the bottom of said post member compatible with the threads on said valve stem so as to permit said post member to be screwed onto said valve stem.

79. A valve lock assembly as described in claim 78 wherein a retaining means is employed to prevent said slide member from becoming separated from said post member while said members are in place on said valve, while allowing sufficient upward movement of said slide member to allow said slide member to clear said stops vertically.

80. A valve lock assembly as described in claim 77 wherein a retaining means is employed to prevent said slide member from becoming separated from said post member while said members are in place on said valve, while allowing sufficient upward movement of said slide member to allow said slide member to clear said stops vertically.

81. A valve lock assembly as described in claim 1 wherein the means for securing said post member to said valve stem is the threaded walls of a recess in the bottom of said post member compatible with the threads on said valve stem so as to permit said post member to be screwed onto said valve stem.

82. A valve lock assembly as described in claim 81 wherein a retaining means is employed to prevent said slide member from becoming separated from said post member while said members are in place on said valve, while allowing sufficient upward movement of said slide member to allow said slide member to clear said stops vertically.

83. A valve lock assembly as described in claim 1 wherein a retaining means is employed to prevent said slide member from becoming separated from said post member while said members are in place on said valve, while allowing sufficient upward movement of said slide member to allow said slide member to clear said stops vertically.

* * * * *